United States Patent [19]

Chen

[11] Patent Number: 5,166,661
[45] Date of Patent: Nov. 24, 1992

[54] AUTOMOBILE ALARM SYSTEM WITH NOISE REDUCTION FUNCTION
[75] Inventor: Michael Chen, Taipei, Taiwan
[73] Assignee: Advance Security Inc., Taipei, Taiwan
[21] Appl. No.: 710,437
[22] Filed: Jun. 7, 1991
[51] Int. Cl.$^5$ ............................................. B60Q 1/00
[52] U.S. Cl. .................. 340/425.5; 340/428; 340/429; 307/10.1; 361/93
[58] Field of Search ............ 340/426, 425.5, 428–430; 361/59, 86, 93, 39; 307/10.1; 364/707

[56] References Cited
U.S. PATENT DOCUMENTS

| | | | |
|---|---|---|---|
| 4,143,368 | 3/1979 | Route et al. | 340/426 X |
| 4,698,748 | 10/1987 | Juzswik et al. | 364/707 X |
| 4,771,356 | 9/1988 | Hastings | 361/59 |
| 4,839,530 | 6/1989 | Greenwood | 340/459 X |
| 5,081,586 | 1/1992 | Barthel et al. | 307/10.1 X |

Primary Examiner—Donnie L. Crosland
Attorney, Agent, or Firm—Browdy and Neimark

[57] ABSTRACT

An automobile alarm system with noise reduction function utilizes a built-in function in a single-chip computer, which is adapted to control the alarm system, to prevent the system being damaged by the noise, while the noise is presented in the form of high voltages, occurring during the operation of the engine. The alarm system has a current detector circuit to sense the presence of noise, and a one-shot circuit to selectively activate/inactivate the single-chip computer temporarily.

1 Claim, 2 Drawing Sheets

AUTOMOBILE ALARM SYSTEM WITH NOISE REDUCTION FUNCTION

BACKGROUND OF THE INVENTION

The present invention relates to an alarm system, and more particularly to an automobile alarm system with a noise reduction function.

An alarm system is will known in modern living. There is usually defined an area from unauthorized intrusion, in which the alarm system is installed. In the case of an automobile alarm system, a number of patents, such as U.S. Pat. No. 4,794,368 to Grossheim et al. will examplify the state of art.

In general, an automobile alarm system includes a microcomputer to take input from a sensor or sensors and to drive an actuator or actuators for warning purposes. There are various functions in this art has been developed and marketed, such as the uses of RF (Radio Frequency) Remote Control technology, voice synthesizer technology, etc. However, in one aspect, these detract from the main object of the present invention.

The present invention is concentrated on the noise problem, which often cause the CPU to be temporily down or permanently damaged. As to those skilled in the art, they would admit that the noise in the form of voltage may be as high as 400 volts. It will intefere the normal function of the CPU.

SUMMARY OF THE INVENTION

An automobile alarm system with noise reduction function is aimed to resolve the problems caused by the noise. This can be accomplished by utilizing a built-in function of a single-chip microcomputer, such as a Toshiba CPU NO TMP 47C 400A, in which a HOLD/SLEEP mode is provided to temporarily inactivate the system as in "sleep" status.

Typically, when starting the HOLD operation mode, the following states can be held:

1. The oscillator stops and the system's internal operations are all held up;
2. The interval timer is cleared to "0";
3. The states of the data memory, registers, and latches valid immediately before the system is put in the hold status are all held; and
4. The program counter holds the address of the instruction to be executed after the instruction which starts the hold operating mode.

The detailed description of the Toshiba CPU TMP 47C 400A is referred to in the manufacturer published manual page 5-35.

Therefore, it is an objective of the present invention to provide a current detector circuit and one-shot circuit to activate/inactivate the HOLD/SLEEP mode preventing the alarm system from being damaged by the noise.

It is an advantage of the present invention to provide a wire connecting to the battery, in contrast to otherwise being connected to an ignition wire, so as to obtain full warranty from the automobile manufacturer, while the latter connection does not.

Other advantages and objectives will be appreciated as the invention becomes better understood by reference to the following description where considered in connection with the accompanying drawings.

DETAILED DESCRIPTION OF THE PREFERRED EMBODIMENT

Figure 1:
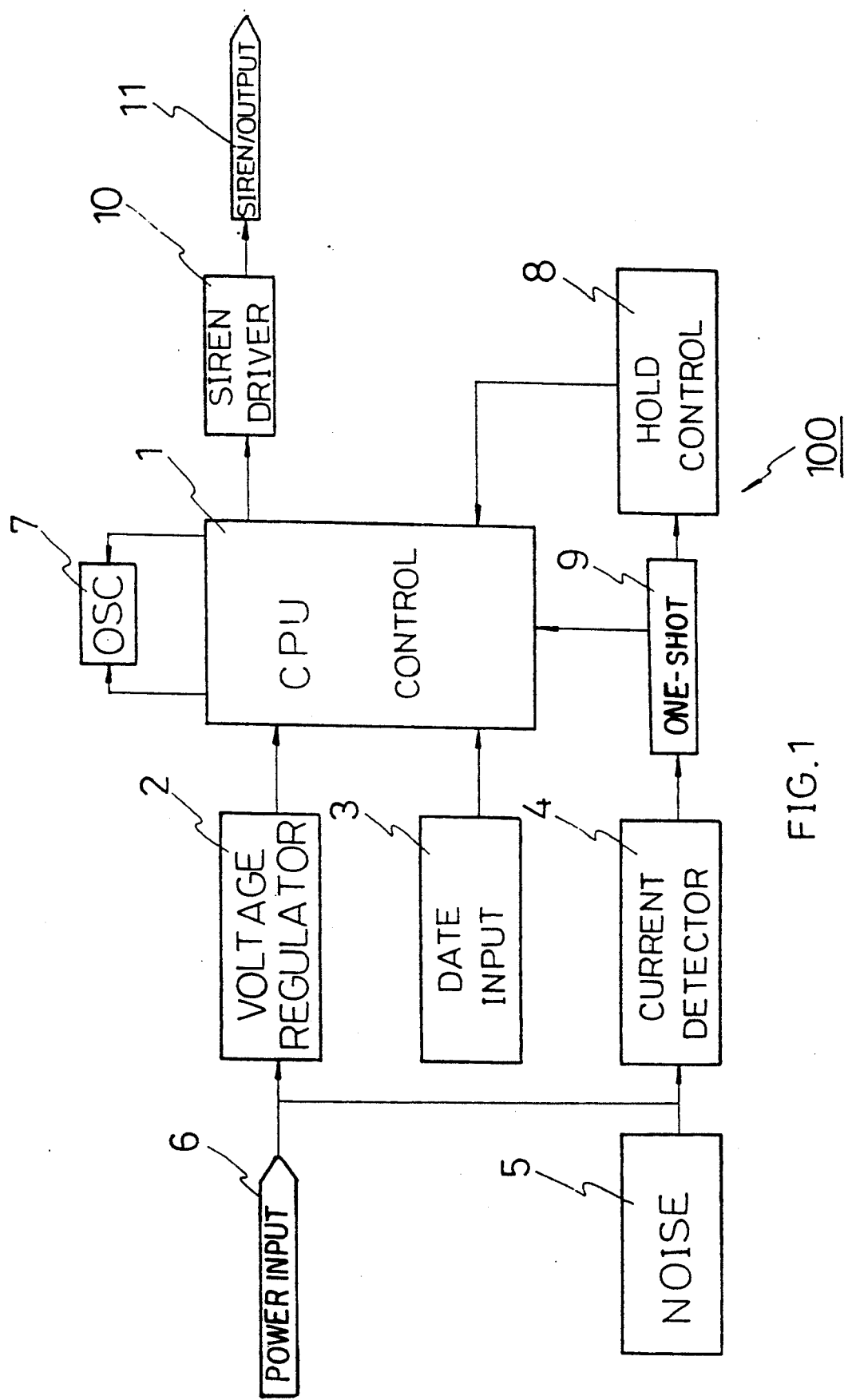
FIG. 1 is a block diagram of the automobile alarm system according to the present invention.

Referring to the drawings, there is illustrated an automobile alarm system, generally designated by the number 100, constructed in accordance with and embodying the features of the present invention.

The system 100 generally has a single chip computer 1 with power supplied by a power input 6 through voltage regulator 2. A siren 11 outputs from the CPU 1 through siren driver 10 to provide warning signals when the automobile is triggered. Connected to the CPU 1 at pin 35 and 36 is date input 3. A noise 5 often present in the form of high voltage can occur, which is connected with the power input 6 and current detector 4 which are in series to the CPU. Provided between the current detector 4 and the CPU is a hold control 8. Further, an oscillator 7 is connected to the CPU at pin 31, 32 in a conventional manner.

Figure 2:
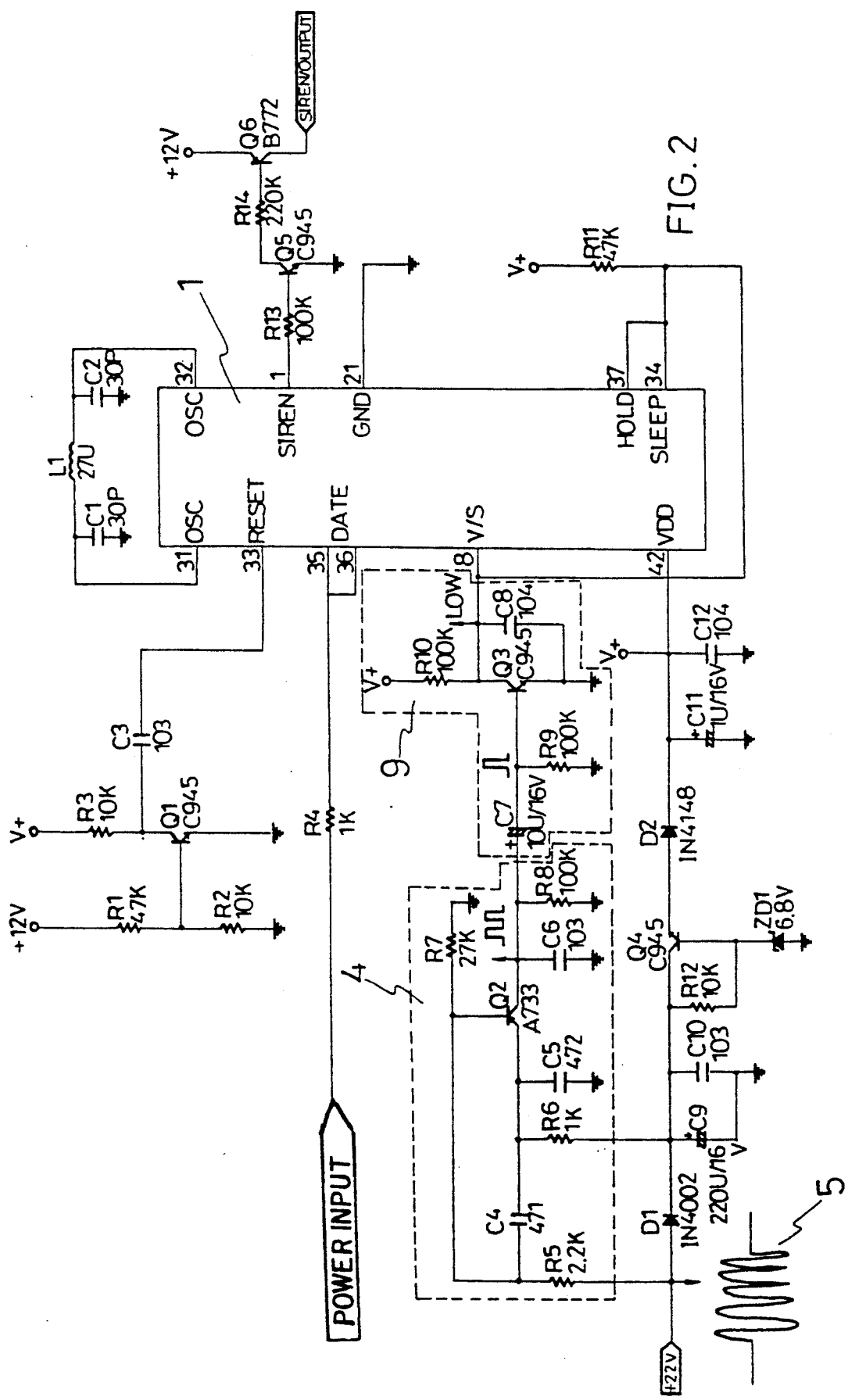
FIG. 2 is a schematic circuit diagram of the automobile alarm system of FIG. 1.

Turning now to FIG. 2, the current detector circuit 4 includes resistors R5, R6, and R7, capacitor C4 and C5, and transistor Q2, wherein resistor R5 connects capacitor C4 in series to the emitter of the transistor Q2, while resistor R7 connected with base of the transistor Q2 and capacitor C5 connected with emitter of the transistor Q2, are grounded.

Connected between the current detector circuit 4 and the voltage regulator circuit 2 is resistor R6. The one-shot circuit 9 includes resistors R6, R9, and R10, capacitor C6, C7, and C8, and transistor Q3. The capacitor C7 is mounted to collector of the transistor Q2, while capacitor C6 and resistor R8 are connected therebetween and to ground. The capacitor C7, on the other end, connects to the base of the transistor Q3, and the resistor R9 is connected therebetween and further to ground. The resistor R10 receives a voltage from a source designated V+ and connects to the collector of transistor Q3. The capacitor C8 is connected to the emitter of the transistor Q3 and to the collector of the transistor Q3.

When the automobile is started, the power input is varied due to an electric charge. The current detector circuit 4 detects the variation thereof to cause the collector of transistor Q2 to output a HI signal, which flows through the one-shot circuit to trigger the transistor Q3 to ON, such that the collector of the transistor Q3 changes from HI to LOW, so as to activate pin 34 and 37 of the CPU from HI to LOW, to enter the HOLD/SLEEP mode. However, when the engine is shut off, the current is steady, whereas the current detector and one-shot circuit is OFF and the collector of transistor Q3 turns to HI, so that pin 34 and 37 of the CPU goes to HI, in other words, the CPU is in "wake-up" mode.

However, as noise in the form of voltage, enters the alarm system, the current detector circuit will sense the collector of transistor Q2 outputting a HI signal to trigger the one-shot circuit, so as to cause the collector of transistor Q3 to change from HI to LOW. In this situation, the CPU is activated to enter HOLD/SLEEP mode to prevent interference or possible damage. In contrast, when the noise disappears, the CPU will automatically wake-up and continuously perform the securing task.

The present embodiment of the present invention has been described herein and shown in the accompanying drawings to illustrate the underlying principle of the invention, but it is to be understood that numerous modifications may be made without departing from the spirit and scope of this invention.

I claim:

1. An automobile alarm system with noise reduction function incorporated with a single-chip microcomputer, characterized in that the system comprises:

a current detector circuit connected to a noise source, a power input for sensing the presence of noise;

a one-shot circuit connected to said current detector circuit and HOLD/SLEEP pins of said single-chip microcomputer whereby when said current detector circuit senses the presence of said noise, said one-shot circuit will generate a signal to temporarily inactivate said single-chip microcomputer and when said noise is absence, said current detector circuit will cause said one-shot circuit to activate said microcomputer.

* * * * *